United States Patent Office 2,822,343
Patented Feb. 4, 1958

2,822,343

ETHYLENICALLY UNSATURATED POLYESTER RESINOUS COMPOSITIONS AND THE CURE THEREOF IN THE PRESENCE OF A CATALYTIC PROMOTER

Harold M. Day, Noroton Heights, Conn., Charles H. Dugliss, Yorktown Heights, N. Y., and Roy R. H. Miron, Stamford, Conn., assignors to American Cyanamid Company, New York, N. Y., a corporation of Maine No Drawing. Application January 14, 1954
Serial No. 404,124

16 Claims. (Cl. 260—45.4)

This invention relates to polyester resinous compositions. More particularly this invention relates to the polymerization (cure) of polymerizable unsaturated polyester resinous compositions wherein a small but effective amount of a catalyst promoter is employed. Additionally this invention relates to polymerizable unsaturated polyester resinous compositions, their manner of production and articles produced therefrom.

Polyester resinous compositions prepared by the reaction of unsaturated polycarboxylic acids and polyhydric alcohols are well known in the art. These unsaturated polyesters are polymerizable and it is also well known to polymerize them with a compound containing a polymerizable $CH_2=C<$ group. In initiating the polymerization of the unsaturated polyester and the polymerizable compound, it is customary to introduce a polymerization catalyst into the reaction mixture. Heat is then applied to the mixture and the polymerization (cure) is thereby effected. In carrying out the polymerization of the mixture, temperatures between about 25° C. and 125° are customarily employed. At these temperatures several objections, not only to the polymerization reaction but also to the cured product, are realized. For instance, at these high temperatures the polymerization rate is so fast and the exothermic heat so great that the resulting stresses and strains developed often result in a cured resinous composition which may be cracked or badly crazed.

We have now discovered that the cure of polymerizable unsaturated polyester resinous compositions with a polymerizable compound containing a polymerizable $CH_2=C<$ group may be effected with a catalyst by the employment of a polymerization catalyst promoter which will be discussed herein more fully below. By the process of our invention, catalysts such as the hydroperoxides may be efficiently employed. Initiating the cure of the resinous materials with catalyst promoters as is done in our invention allows a low cost catalyst, e. g., cumene hydroperoxide, to be used and also controllable and practical curing cycle to be obtained.

It is an object of our invention to polymerize (cure) unsaturated polyester resinous compositions with a compound containing a polymerizable $CH_2=C<$ group. It is a further object of our invention to effect said cure by the employment of a polymerization catalyst promoter. These and other objects of our invention will be discussed more fully herein below.

In the preparation of the polymerizable unsaturated polyester resinous compositions of our invention, one may make use of the ethylenically unsaturated polycarboxylic acids such as maleic, fumaric, aconitic, itaconic, and the like. The ethylenically unsaturated polycarboxylic acids include those known as the alpha,beta unsaturated acids. These unsaturated acids should be present in an amount approximating at least 20% by weight of the total weight of the polycarboxylic acids used and preferably in amounts varying between about 25% and 65% by weight based on the total weight of polycarboxylic acid present. If it is desired to make use of saturated polycarboxylic acids, i. e., those which are free of non-benzenoid unsaturation, one could use such acids as phthalic, malonic, succinic, glutaric, sebacic, and the like, but in amounts less than a larger proportion of the total amount of polycarboxylic acid present. Whenever available, the anhydrides of these acids may be used, e. g., maleic anhydride, phthalic anhydride, and as used herein polycarboxylic acids include the polycarboxylic anhydrides when available. Also, mixtures of the acids and anhydrides may be used in the preparation of the polyester resin.

As polyhydric alcohols which may be used in the preparation of the polymerizable unsaturated polyesters of the present invention, it is preferred that those alcohols containing only two hydroxy groups be used. However, those alcohols containing three hydroxy groups, four hydroxy groups, or more hydroxy groups may be used in minor amounts. Illustrative examples of the various dihydroxy alcohols that find employment in our invention are: ethylene glycol; diethylene glycol; propylene glycol; dipropylene glycol; butanediol-1,4; butanediol-1,3; butanediol-1,2; pentanediol-1,4; pentanediol-1,5; hexanediol-1,6; and the like. Additionally, such polyhydric alcohols as glycerol, 1–1'-isopropylidenebis(p-phenylenoxy)di-2-propanol, pentaerythritol, dipentaerythritol, and the like may be used in our invention.

In the preparation of the polymerizable unsaturated polyesters, one may use the polyhydric alcohols and the polycarboxylic acids in a proportion substantially equally about mol for mol and preferably an excess of alcohol approximating 10% above the stoichiometric quantity required for complete esterification. If polyhydric alcohols containing more than two hydroxy groups are used, calculation of the molar proportion should be made on a stoichiometric basis so as to make allowance for the additional hydroxy groups such as those found in glycerol, pentaerythritol and the like. This is also true when polycarboxylic acids having more than two carboxyl groups are employed. A sufficient quantity of the alcohol and acid should be reacted so as to produce an ultimate polyester resinous material having an acid number not greater than about 55 and, preferably, an acid number from about 35 to 40. The polymerizable unsaturated polyesters are admixed with a monomeric compound containing the polymerizable $CH_2=C<$ group to give a composition that may be cured to a stable thermoset condition. One may use from about 10 parts by weight of the monomeric material to about 90 parts of the unsaturated polyester resin up to about 80 parts of the monomeric material to about 20 parts of the polymerized unsaturated polyester resin. The preferred embodiment, however, is to use from about 25 parts of the monomeric material to about 35 parts of the monomeric material with about 75 parts to about 65 parts, respectively, of the polymerizable unsaturated polyester resin.

The monomeric material containing the polymerizable $CH_2=C<$ group has a boiling point of at least 60° C. Among the polymerizable monomeric materials that may find use in our invention are such as styrene, side-chain alkyl and halo substituted styrenes such as alpha methylstyrene, alpha chlorostyrene, alpha ethylstyrene and the like or alkyl and halo ring-substituted styrene such as ortho, meta and paraalkyl styrenes such as o-methylstyrene, p-ethylstyrene, m-propylstyrene, 2,4-dimethylstyrene, 2,5-diethylstyrene, bromostyrene, chlorostyrene, dichlorostyrene, and the like. Still further, one can make use of the allyl compounds such as diallyl phthalate, tetrachlorodiallyl phthalate, allyl alcohol, methallyl alcohol, allyl acetate, allyl methacrylate, diallyl carbonate, allyl lactate, allyl alphahydroxisobutyrate, allyl trichlorosilane, allyl acrylate, diallyl malonate, diallyl oxalate, diallyl gluconate, diallyl methylgluconate, diallyl adipate, diallyl sebacate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyaconitate, triallyl cyanurate, triallyl citrate, triallyl phosphate, trimethallyl phosphate, tetraallyl silane, tetraallyl silicate, hexallyl disiloxane and the like.

In the formulation of the resinous composition of our invention, it is necessary that a catalyst be present to effect the polymerization of the unsaturated polyester resin and the monomeric material containing the polymerizable $CH_2=C<$ group. It is preferred, as is well known in the art, that a catalyst of the peroxide class be utilized. The amount of the catalyst employed may vary over rather wide limits to give varying catalyzed stability. Thus, from about 0.1% to about 10% by weight based on the total weight of the polymerizable composition may be used. Preferably, from about 0.05% to about 1% by weight of the catalyst based on the total weight of the polymerizable resinous composition gives the desired results. It is obvious that other proportions of the catalyst may be utilized when a faster or slower rate of cure is desired. Examples of the organic peroxide catalyst that may be used in our invention are such as benzoyl peroxide, succinyl peroxide, acetyl peroxide, methyl ethyl ketone peroxide, cumene hydroperoxide, tertiarybutyl hydroperoxide, cyclohexanone peroxide, perbenzoic acid, peracetic acid, anisoyl peroxide, toluyl peroxide, p-bromobenzoyl peroxide, tertiarybutyl perbenzoate, p-menthane hydroperoxide, pinane hydroperoxide, diisopropylbenzene hydroperoxide, 1-cyclohexanol-1-hydroperoxide, furoyl peroxide and chloracetyl peroxide or any organic ozonide, such as diisopropylene ozonide, diisobutylene ozonide, or a mixture of such substances may be used as the curing catalyst.

In order to control the rate of polymerization during the cure of the resinous composition of our invention, it is advantageous to add a moderate amount of an inhibiting agent to the composition. The amount of inhibiting agent used is that required to give a minimum storage stability to the uncatalyzed mixture. Examples of inhibiting agents that may be used in our invention are such as hydroquinone, pyrogallol, tannic acid, tertiarybutyl catechol, or an organic amine such as aniline or phenylene diamine. Mixtures of the inhibiting agents may also be used if desired. About 0.008% of inhibiting agent by weight, based on the total weight of the resinous composition, usually gives satisfactory results.

In order to obtain the desired cure of the resinous compositions of our invention, it is necessary that a small but effective amount of a promoter for the catalyst be present in the reaction mixture. We have found that, when a compound or the salts thereof containing the basic imino group

wherein R is either hydrogen or an organic radical is added to the reaction mixture, the desired cure may be obtained. From about 0.005% to about 0.2% by weight of the catalyst promoter, based on the total weight of the resinous composition, may be employed to obtain the desired curing cycle. Generally, however, from about 0.01% to about 0.1% by weight of the promoter containing the basic imino group is satisfactory. The promoter may be introduced into the resinous composition at any point prior to the cure thereof.

After the promoter has been introduced into the composition, the desired catalyst is then also introduced therein and the resinous material then cured. We have found that an efficient process for introducing the promoter into the resinous composition is to dissolve it in a suitable solvent and then to stir this solution into the resinous material. Inasmuch as the presence of a catalyst in the material would cause a spontaneous cure, it is necessary that the catalyst not be introduced into the composition until just prior to its cure. The promoter may be the compound containing the basic imino group or it may be the salt of said compound. Examples of compounds containing the basic imino group that may be employed as the catalyst promoter in the resinous compositions of our invention are such as the guanidines, e. g., 1,2-diphenyl guanidine, diphenyl-p-tolylguanidine hydrochloride, di-o-tolylguanidine, 1,3-dixylylguanidine, dodecylguanidine, ethyleneguanidine hydrochloride, 1,1'-(ethylenedi-p-phenylene) diguanidine hydrochloride, 1-ethyl-1,2,3-triphenylguanidine hydrochloride, p-hydroxybenzyl guanidine, methoxyguanidine sulfate, guanidine hydrochloride, N,N-dicyclohexylguanidine hydrochloride, N,N-dicyclohexylguanidine, butyldicyclohexyl guanidine bicarbonate, octylguanidine nitrate; the isomelamines, e. g., 1,3,5-tribenzylisomelamines, triphenylisomelamines; the amidines, e. g., acetamidine, benzamidine, dodecylamidine hydrochloride, acetamidine hydrochloride; the biguanides, e. g., 1,1 - bis(2 - hydroxyethyl) - 3,5 - bis(3 - methoxypropyl)-biguanide acetate, 1-(p-bromophenyl)-biguanide hydrochloride, p-chlorophenyl biguanide, (3-dibenzofuryl)-methylbiguanidine, 1-(p-iodophenyl)biguanidine hydrochloride, (p-methoxyphenyl)sulfanilylbiguanidine, o-tolylbiguanidine, 1-(p-chlorophenyl)-5-isopropylbiguanidine, 1-(2-dibenzofuryl)-biguanidine, phenylbiguanidine hydrochloride, isopropylbiguanidine hydrochloride; the guanylureas, e. g., guanyl(phenylsulfonyl)guanylurea, 1-guanyl-2-thioguanylurea carbonate, heptylguanylurea, 1-hexyl-1-methyl-guanylurea, (2-hydroxyethyl)guanylurea, 1-(alphahydroxybutyryl)guanylurea; the pseudoureas, e. g., 2-(7 - chloro - 4 - methyl - 2 - guinolyl) - 2 - thio - pseudourea hydrochloride, 2-p-cyanobenzyl-2-thiopseudourea hydrochloride, 2-cyclohexylpseudourea, 2-decylpseudourea, ethylpseudourea, 2-docecylpseudourea hydrochloride, 2-(dodecyloxymethyl) - 2 - thiopseudourea hydrochloride, laurylpseudourea hydrochloride, dimethylallyl pseudourea; the pseudothioureas, e. g., ethylpseudothiourea hydrochloride and ethylpseudothiourea hydrobromides and the like.

In order that those skilled in the art may more fully understand the inventive concept herein presented, the following examples are given by way of illustration and not in limitation unless so noted in the appended claims. All parts are parts by weight.

EXAMPLE I

A polymerizable unsaturated polyester was prepared by reacting 6.6 mols of propyleneglycol, 3.0 mols of phthalic anhydride and 3.0 mols of maleic anhydride under an atmosphere of carbon dioxide and at an elevated temperature until an acid number of between 35 and 40 was obtained. 72 parts of the polyester were then combined with 36.2 parts of styrene. A fast curing resinous composition was obtained by employing as the catalyst 0.5% by weight of cumene hydroperoxide and 0.05% by weight of benzamidine hydrochloride as the catalyst promoter.

EXAMPLE II

A polymerizable unsaturated polyester was prepared by reacting 667 parts of diethyleneglycol, 232 parts fumaric acid and 584 parts of adipic acid under an inert atmosphere of nitrogen and at an elevated temperature until an acid number of between 15 and 20 was obtained. One part of the polyester was then combined with two parts of methylstyrene. In order to obtain a rapid curing composition, the mixture was catalyzed with 0.5% by weight of cumene hydroperoxide and as the promoter 0.05% of benzamidine hydrochloride.

EXAMPLE III

In order to show the promotive effect of the compounds containing the basic imino group, the polymerizable unsaturated polyester admixed with styrene, as set forth in Example I above, was catalyzed with 0.4% by weight of cumene hydroperoxide. Various compounds containing the basic imino group were employed as promoters therein. The results obtained are set forth in the table below.

Table I

| Conc., Percent | Promoter | Peak (°C.) | Time, Min. | Gel Time (Min.) |
|---|---|---|---|---|
| 0.01 | Acetamidine Hydrochloride | 104 | 12 | 6.25 |
| 0.01 | Laurylamidine Hydrochloride | 128 | 12 | 6.25 |
| 0.1 | Dicyclohexyl Guanidine Hydrochloride | 138 | 13 | 5.5 |
| 0.01 | do | 97 | 12 | 7.25 |
| 0.1 | Dicyclohexyl Guanidine | 140 | 12 | 5.25 |
| 0.01 | do | 96 | 13.25 | 6.5 |
| 0.1 | Phenyl Biguanide Hydrochloride | 90 | 16.25 | 9 |
| 0.1 | Isopropyl Biguanide Hydrochloride | 90 | 12 | 7 |
| 0.01 | do | 90 | 14.5 | 8 |
| 0.1 | Guanidine Hydrochloride | 146 | 13.5 | 7.25 |
| 0.1 | Ethyl Pseudothiourea Hydrobromide | 122 | 12 | 6 |

The gel time, peak exotherm and time to reach the peak exotherm were obtained in accordance with the procedure taken from the Sixth Annual Technical Session of the Reinforced Plastics Division, Society of the Plastics Industry. In the procedure, as there outlined, a 19 by 150 millimeter test tube is filled to a height of exactly 3 inches with a catalyzed resin and the test tube is then inserted in a water bath maintained at 180° F. A thermocouple is inserted into the resin in order to obtain the temperature of the peak exotherm. The gel time is that time required for the resin to reach 10° F. above bath temperature. The exotherm time is that time required for the temperature to reach the maximum temperature for the specified bath temperature.

EXAMPLE IV

In order to show the effectiveness of the promoters of our invention, the resinous material prepared in accordance with Example I was catalyzed with various peroxide catalysts and 0.05% by weight of benzamidine hydrochloride was employed as the promoter. The results obtained are set forth herein below. In each instance 0.5% by weight of catalyst was used.

Table II

| Catalyst | With 0.05% Benzamidine Hydrochloride | | | Without Benzamidine Hydrochloride | | |
|---|---|---|---|---|---|---|
| | Time to— | | Peak Exotherm, °C. | Time to— | | Peak Exotherm, °C. |
| | Gel | Peak | | Gel | Peak | |
| Cyclohexanone Peroxide | 4'40" | 13'05" | 113 | 8'15" | 20'00" | 102 |
| 1-cyclohexanol-1-hydroperoxide | 7'35" | 15'25" | 92 | 17'30" | 32'30" | 92 |
| t-Butyl Hydroperoxide | 3'30" | 9'25" | 109 | 39'00" | 39'00" | 84 |
| t-Butyl Perbenzoate | 7'35" | 16'40" | 136 | 30'00" | 66'00" | 86 |
| Methylethylketone Peroxide | 4'05" | 8'40" | 177 | 5'15" | 10'20" | 165 |
| Paramenthane Hydroperoxide | 3'25" | 9'15" | 138 | 29'00" | 40'00" | 88 |
| Pinane Hydroperoxide | 3'00" | 7'40" | 144 | 27'20" | 46'50" | 88 |
| Diisopropylbenzene Hydroperoxide | 3'50" | 11'00" | 125 | 44'00" | 44'00" | 85 |
| Cumene Hydroperoxide | 5'00" | 11'50" | 135 | 28'00" | 46'20" | 88 |

COMPARATIVE EXAMPLE

When the resinous composition prepared in accordance with Example I was catalyzed with cumene hydroperoxide and no promoter was present in the mixture, the material did not gel and no peak exotherm was reached when the resinous composition was subjected to the standard SPI test set forth above.

The resinous compositions of our invention found particular use in the preparation of laminated articles composed of a filler impregnated with and bonded with the reaction product. In the preparation of the laminated articles, it is customary to impregnate or coat the filler with the liquid polymerizable mixture. These impregnated materials may then be plied together and formed to the desired shape. Heat is usually applied to raise the temperature of the polymerizable mixture to a point where the polymerization will take place. However, by the use of the promoters of our invention, it is possible to polymerize the reaction mixture at room temperature. In order to obtain a faster curing cycle, it is desirable in most cases to apply a slightly elevated temperature.

The resinous composition of our invention also finds employment where castings are to be prepared. In this case the polymerizable mixture is poured into a form of desired shape in which the material is allowed to cure either at room temperature or when subjected to elevated temperatures. In the production of laminated articles wherein the base material is impregnated with the resinous composition, the sheet material may be such as paper, cloth or fibrous glass. Other materials will be apparent to those skilled in the art. Additives such as dyes, pigments or other colorants may also be introduced into the resinous composition in order to obtain a cured product of any desired color. It will also be apparent that when castings are prepared utilizing the resinous composition both filled and unfilled articles may be produced.

We claim:
1. A resinous composition comprising the polymerizable mixture of (1) an ethylenically unsaturated polycarboxylic acid-polyhydric alcohol polyester, (2) a compound containing a polymerizable $CH_2=C<$ group and having a boiling point of at least 60° C., a polymerization catalyst for (1) and (2), and (3) a catalytic amount of an ingredient selected from the group consisting of the guanidines, isomelamines, amidines, biguanides, guanylureas, pseudoureas, pseudothioureas and the salts thereof, whereby catalytic activity of the polymerization catalyst is promoted.

2. In the process for curing a polymerizable mixture comprising an ethylenically unsaturated polycarboxylic acid-polyhydric alcohol polyester and a compound containing a polymerizable $CH_2=C<$ group and having a boiling point of at least 60° C. in the presence of a polymerization catalyst therefor, the improvement which comprises introducing into said polymerizable mixture an ingredient selected from the group consisting of the guanidines, isomelamines, amidines, biguanides, guanylureas, pseudoureas, pseudothioureaus and the salts thereof, whereby the catalytic activity of said polymerization catalyst is promoted.

3. A method for producing a resinous composition which comprises preparing a polymerizable composition comprising a polymerizable ethylenically unsaturated polycarboxylic acid-polyhydric alcohol polyester resin, a compound containing a polymerizable $CH_2=C<$ group and having a boiling point of at least 60° C., a polymerization catalyst therefor and a catalytic amount of an ingredient selected from the group consisting of the guanidines, isomelamines, amidines, biguanides, guanylureas, pseudoureas, pseudothioureas and the salts thereof, whereby the catalytic activity of said polymerization catalyst is promoted and curing said composition.

4. A resinous composition comprising the polymerizable mixture of (1) an ethylenically unsaturated polycarboxylic acid-polyhydric alcohol polyester, (2) styrene, a polymerization catalyst for (1) and (2), and (3) a catalytic amount of an ingredient selected from the group consisting of the guanidines, isomelamines, amidines, biguanides, guanylureas, pseudoureas, pseudothioureas and the salts thereof, whereby catalytic activity of the polymerization catalyst is promoted.

5. A resinous composition comprising the polymerizable mixture of (1) an ethylenically unsaturated polycarboxylic acid-polyhydric alcohol polyester, (2) methylstyrene, a polymerization catalyst for (1) and (2), and (3) a catalytic amount of an ingredient selected from the group consisting of the guanidines, isomelamines, amidines, biguanides, guanylureas, pseudoureas, pseudothioureas and the salts thereof, whereby catalytic activity of the polymerization catalyst is promoted.

6. A resinous composition comprising the polymerizable mixture of (1) an ethylenically unsaturated polycarboxylic acid-polyhydric alcohol polyester, (2) styrene, a polymerization catalyst for (1) and (2), and (3) a catalytic amount of benzamidine hydrochloride whereby catalytic activity of the polymerization catalyst is promoted.

7. A resinous composition comprising the polymerizable mixture of (1) an ethylenically unsaturated polycarboxylic acid-polyhydric alcohol polyester, (2) styrene, a polymerization catalyst for (1) and (2), and (3) a catalytic amount of acetamidine hydrochloride whereby catalytic activity of the polymerization catalyst is promoted.

8. A resinous composition comprising the polymerizable mixture of (1) an ethylenically unsaturated polycarboxylic acid-polyhydric alcohol polyester, (2) methylstyrene, a polymerization catalyst for (1) and (2), and (3) a catalytic amount of benzamidine hydrochloride whereby catalytic activity of the polymerization catalyst is promoted.

9. A resinous composition comprising the polymerizable mixture of (1) an ethylenically unsaturated polycarboxylic acid-polyhydric alcohol polyester, (2) a compound containing a polymerizable $CH_2=C<$ group and having a boiling point of at least 60° C., as the polymerization catalyst cumene hydroperoxide and (3) a catalytic amount of an ingredient selected from the group consisting of the guanidines, isomelamines, amidines, biguanides, guanylureas, pseudoureas, pseudothioureas and the salts thereof, whereby catalytic activity of the polymerization catalyst is promoted.

10. A resinous composition comprising the polymerizable mixture of (1) an ethylenically unsaturated polycarboxylic acid-polyhydric alcohol polyester, (2) a compound containing a polymerizable $CH_2=C<$ group and having a boiling point of at least 60° C., as the polymerization catalyst pinane hydroperoxide and (3) a catalytic amount of an ingredient selected from the group consisting of the guanidines, isomelamines, amidines, biguanides, guanylureas, pseudoureas, pseudothioureas and the salts thereof, whereby catalytic activity of the polymerization catalyst is promoted.

11. A resinous composition comprising the polymerizable mixture of (1) an ethylenically unsaturated polycarboxylic acid-polyhydric alcohol polyester, (2) styrene, cumene hydroperoxide as the polymerization catalyst for (1) and (2), and (3) a catalytic amount of an ingredient selected from the group consisting of the guanidines, isomelamines, amidines, biguanides, guanylureas, pseudoureas, pseudothioureas and the salts thereof, whereby catalytic activity of the polymerization catalyst is promoted.

12. A resinous composition comprising the polymerizable mixture of (1) an ethylenically unsaturated polycarboxylic acid-polyhydric alcohol polyester, (2) methylstyrene, pinane hydroperoxide as the polymerization catalyst for (1) and (2), and (3) a catalytic amount of an ingredient selected from the group consisting of the guanidines, isomelamines, amidines, biguanides, guanylureas, pseudoureas, pseudothioureas and the salts thereof, whereby catalytic activity of the polymerization catalyst is promoted.

13. A resinous composition comprising the polymerizable mixture of (1) an ethylenically unsaturated polycarboxylic acid-polyhydric alcohol polyester, (2) styrene, as the polymerization catalyst cumene hydroperoxide and (3) a catalytic amount of benzamidine hydrochloride whereby catalytic activity of the polymerization catalyst is promoted.

14. A resinous composition comprising the polymerizable mixture of (1) an ethylenically unsaturated polycarboxylic acid-polyhydric alcohol polyester, (2) methylstyrene, as the polymerization catalyst cumene hydroperoxide and (3) a catalytic amount of benzamidine hydrochloride whereby catalytic activity of the polymerization catalyst is promoted.

15. A resinous composition comprising the polymerizable mixture of (1) an ethylenically unsaturated polycarboxylic acid-polyhydric alcohol polyester, (2) styrene, as the polymerization catalyst pinane hydroperoxide and (3) a catalytic amount of benzamidine hydrochloride whereby catalytic activity of the polymerization catalyst is promoted.

16. A resinous composition comprising the polymerizable mixture of (1) an ethylenically unsaturated polycarboxylic acid-polyhydric alcohol polyester, (2) methylstyrene, as the polymerization catalyst pinane hydroperoxide and (3) a catalytic amount of benzamidine hydrochloride whereby catalytic activity of the polymerization catalyst is promoted.

References Cited in the file of this patent

UNITED STATES PATENTS

| | | |
|---|---|---|
| 2,332,898 | D'Alelio | Oct. 26, 1943 |
| 2,452,669 | Levine | Nov. 2, 1948 |

OTHER REFERENCES

Conant: "The Chemistry of Organic Compounds," 3rd edition, 1947, page 599.

U. S. DEPARTMENT OF COMMERCE
PATENT OFFICE

CERTIFICATE OF CORRECTION

Patent No. 2,822,343  Harold M. Day et al.  February 4, 1958

It is hereby certified that error appears in the printed specification of the above numbered patent requiring correction and that the said Letters Patent should read as corrected below.

Column 5, Table I, under the heading "Promoter", third line, for "Hydro-" read -- Hydrochloride --.

Signed and sealed this 27th day of May 1958.

(SEAL)
Attest:
KARL H. AXLINE

Attesting Officer

ROBERT C. WATSON
Commissioner of Patents